Jan. 1, 1935.    L. C. SHIPPY    1,986,374
METHOD OF MAKING A KNOB
Filed Jan. 18, 1932

Inventor
Leo C. Shippy
By Spencer Hardman & Fehr
his Attorneys

Patented Jan. 1, 1935

1,986,374

UNITED STATES PATENT OFFICE 1,986,374

METHOD OF MAKING A KNOB

Leo C. Shippy, Anderson, Ind., assignor, by mesne assignments, to General Motors Corporation, Detroit, Mich., a corporation of Delaware Application January 18, 1932, Serial No. 587,303

3 Claims. (Cl. 18—59)

This invention relates to handles or knobs, for example, knobs for gear shift levers of automotive vehicles.

It is an object of the invention to make a solid knob of molded material at the lowest possible cost, and this object is accomplished in the disclosed embodiment of the present invention by first making a core from the scrap or "flash" obtained around the presses in which molded articles are formed of artificial resinous compound. This core is set in a mold, and uncured molding material is placed about the core and the entire mass is subject to a molding operation to cause the uncured material to flow around the core and to be cured within a relatively short time. This process therefore permits the use of scrap material for forming the major portion of the knob and reduces the cost by the saving in time in molding, since the time for molding the relatively thin coating of bakelite around the core is relatively short as compared with the time which would be required for molding a solid knob directly from uncured artificial resinous compound.

Further objects and advantages of the present invention will be apparent from the following description, reference being had to the accompanying drawing, wherein a preferred embodiment of one form of the present invention is clearly shown.

Figure 1:
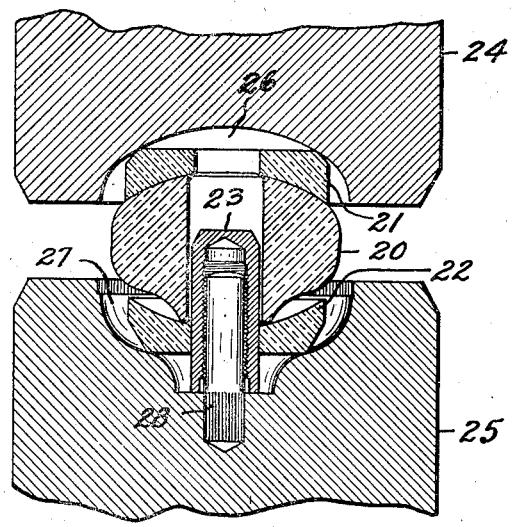
Fig. 1 is a longitudinal sectional view showing the parts of a molding press located in separated position and receiving the various parts required to form a knob.

Referring to Fig. 1, 20 designates a core which is formed from scrap molding material such as "flash", the excess material which overflows the molds. This scrap molding material is ground up and is passed through a 60-mesh screen. The core 20 formed of this material is molded by the conventional bakelite molding press operated at a temperature preferably from 320 to 350° F., and at a pressure of four tons total pressure for the ordinary hand knob used in a transmission gear shift lever. Obviously the pressure will vary according to the mass of the articles molded.

Figure 2:
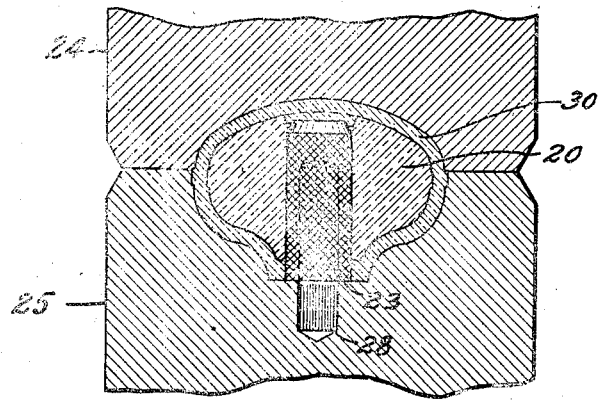
Fig. 2 is a view similar to Fig. 1 showing the press in closed position.

The uncured artificial resinous compound required for coating the core is compressed into two "pills" or "preforms" 21 and 22. 23 designates an internally threaded metal insert or nut required for attaching the knob to a threaded upper end of a lever. This insert 23 has a knurled exterior as shown in Fig. 2. These articles are placed between molds 24 and 25 having molding recesses 26 and 27 respectively. The recess 27 is coaxial with respect to a locating pin 28 press-fitted into the mold 25. The pin receives the insert 23 around which the core 20 and the preform 22 are placed. The preform 21 is placed upon the core 20. The molds are operated at a temperature and pressure such as ordinarily employed in artificial resinous compound molding operations; and the molding operation causes the core 20 to contract around the insert 23 and the uncured artificial resin in the preforms 21 and 22 to flow to fill the mold space surrounding the core 20 and to provide, when cured, a coating 30 of cured, new artificial resin of substantial uniform thickness.

The knock out devices usually employed for removing the work from the mold have not been shown, it being understood that such devices are well known and will be employed where required.

It is obvious that the present invention materially reduces the cost of manufacture of solid knobs of molded material since the major portion, the core 20, is made from scrap material and the time required for curing the relatively thin coating 30 is very much less than that which would be required for curing a knob molded directly from uncured artificial resin.

The artificial resinous compound can be any molding material which is rendered permanent in form by heat or pressure or both.

While the form of embodiment of the present invention as herein disclosed constitutes a preferred form, it is to be understood that other forms might be adopted, all coming within the scope of the claims which follow.

What is claimed is as follows.

1. The method of making a solid knob having a knob attaching part inserted therein which includes molding a core of scrap molded compound having a recess for receiving the attaching part, said recess being a little larger than the part, and in molding new molding compound around the core while compressing the core to cause the same to contract around the knob attaching part.

2. The method of making a solid knob having an internally threaded insert which includes molding a core of scrap molded compound having a hole for receiving the insert, said hole being slightly larger than the insert, and in molding new molding compound around the core while compressing the core to cause the same to contract around the insert.

3. The method of making a solid knob having an internally threaded insert which includes molding a core of scrap molded compound having a hole for receiving the insert, said hole being slightly larger than the insert, placing the threaded insert around a central locating pin in the lower half of the mold, placing a preform of uncured new molding compound around the insert, placing the core around the insert and upon the preform, placing a second preform of uncured new molding compound upon the core, and in subjecting these articles within the molded cavities to heat and pressure to cause the uncured molding compound to flow around the core and to provide a coating for the core, and to cause the core to contract around the insert.

LEO C. SHIPPY.